United States Patent [19]

Peterson et al.

[11] Patent Number: 4,936,156
[45] Date of Patent: Jun. 26, 1990

[54] MECHANICAL TRANSMISSION SHIFTING MECHANISM

[75] Inventors: Paul R. Peterson, Scotts; Lloyd A. Waling, Kalamazoo; Robert J. Bailey, Portage, all of Mich.

[73] Assignee: Eaton Corporation, Cleveland, Ohio

[21] Appl. No.: 369,488

[22] Filed: Jun. 21, 1989

[51] Int. Cl.⁵ .......................... F16H 5/14; G05G 9/12
[52] U.S. Cl. .................................. 74/335; 74/364; 74/473 R
[58] Field of Search .................... 74/335, 364, 473 R; 91/527

[56] References Cited

U.S. PATENT DOCUMENTS

| | | | |
|---|---|---|---|
| 2,137,939 | 11/1938 | Eaton | 74/335 X |
| 2,137,953 | 11/1938 | Rowley | 74/335 X |
| 2,157,592 | 5/1939 | Casler | 74/335 |
| 2,931,237 | 4/1960 | Backus | 74/364 X |

Primary Examiner—Allan D. Herrmann
Attorney, Agent, or Firm—A. E. Chrow

[57] ABSTRACT

An improved fluid operated (X-Y) shifting mechanism (100) is provided for shifting gears or clutches of a mechanical change gear transmission. Mechanism (100) features a shift finger (14) that is secured to a shaft (6) that is moved in an axial (Y—Y) direction by at least one piston (28) and is pivoted in a substantially transverse (X—X) direction by at least one piston (12) having a bore (10) in which an end of shaft (6) is supported and operative to rotate relative thereto to substantially lessen rotational inertia in encountered shifting in the (X—X) direction particularly during cold weather.

7 Claims, 1 Drawing Sheet

MECHANICAL TRANSMISSION SHIFTING MECHANISM

INTRODUCTION

This invention relates generally to a fluid operated (X-Y) shifting mechanism for shifting gears or clutches of a mechanical change gear transmission by pivoting a shift finger in a first (X—X) direction and moving the shift finger in a second axial (Y—Y) direction that is substantially transverse to the (X—X) direction and more particularly to an improved fluid operated (X-Y) shifting mechanism that is provided with reduced rotational inertia when the shift finger is pivoted in the (X—X) direction.

BACKGROUND OF THE INVENTION

A variety of (X-Y) type shifting mechanisms for shifting gears or clutches of a mechanical change gear transmission are known in the art. Such mechanical change gear transmissions characteristically feature a plurality of substantially parallel shift rails that are selectively engageable by pivoting a shift finger in a first (X—X) direction that is substantially transverse to the direction of their substantial parallel alignment and then moving the selected shift rail to effect the gear shift desired by moving the shift finger in a second direction (Y—Y) that is substantially transverse to the (X—X) direction and substantially parallel to the alignment direction of the shift rails.

An early example of a mechanical transmission fluid operated (X-Y) shifting mechanism is disclosed in U.S. Pat. No. 2,137,939, the disclosure of which is incorporated herein by reference. In this mechanism, shift finger (17) is pivoted by selector device (25) to selectively engage one of shift bars (22,23, or 24) but is secured to enlarged piston heads (4 and 15) as well as to enlarged piston heads (77 and 78) causing them all to rotate when shift finger (17) is pivoted by selector device (25) resulting in a substantial amount of rotational inertia and friction to be overcome in pivoting shift finger (17), particularly during cold weather operation when fluid seals and the like are in a hardened condition and the fluid itself more viscous.

Another example of a mechanical transmission fluid operated (X-Y) shifting mechanism is disclosed in U.S. Pat. No. 2,931,237, the disclosure of which is incorporated herein by reference. Here however, as shown in FIG. 3, shift rod actuator (211) is fixedly secured to shaft (192) which is received through and fixedly secured to piston (193) so that piston (193) is able to move shaft (192) axially but is also rotated in unison therewith when shaft (192) is rotated by actuator (211) requiring the seals in outer surface of piston (193) to rotate relative the large diameter bore surface and thereby creating high rotational inertia and friction to be overcome during shifting particularly during cold weather operating conditions. The mechanism described in U.S. Pat. No. 2,931,237 was known in the art as the "Fuelaire" system in which piston (193) was press fitted onto shaft (192) without seal (199).

SUMMARY OF THE INVENTION

Accordingly, it is an object of this invention to provide an (X-Y) shifting mechanism for shifting change gears of a mechanical transmission that advantageously lessens rotational inertia and friction encountered during the shifting operation.

It is another object of this invention to provide an (X-Y) shifting mechanism for a mechanical change gear transmission having an advantageous decrease in rotational inertia and friction encountered during the shifting operation particularly when shifting under cold temperature operating conditions.

DESCRIPTION OF SOME PREFERRED EMBODIMENTS

Figure 1:
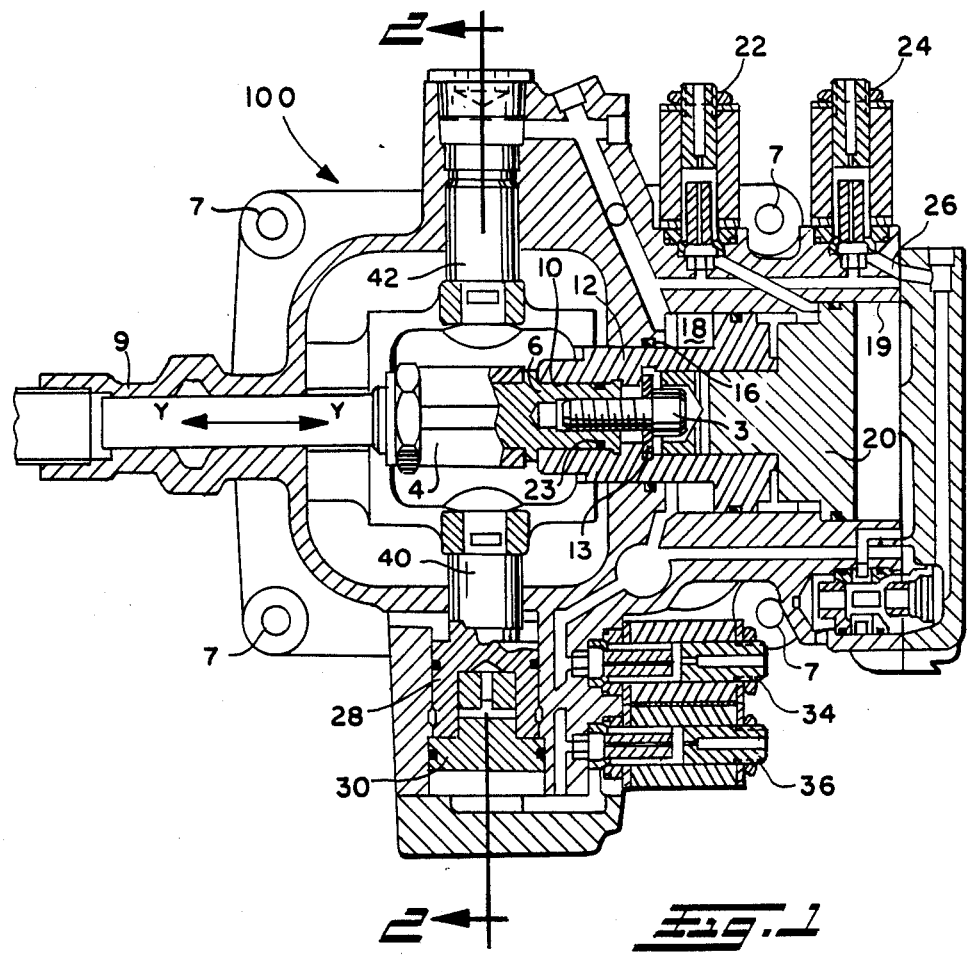
FIG. 1 is a central cross-sectional plan view of a preferred embodiment or an (X-Y) shifting mechanism 100 of the invention.
Figure 2:
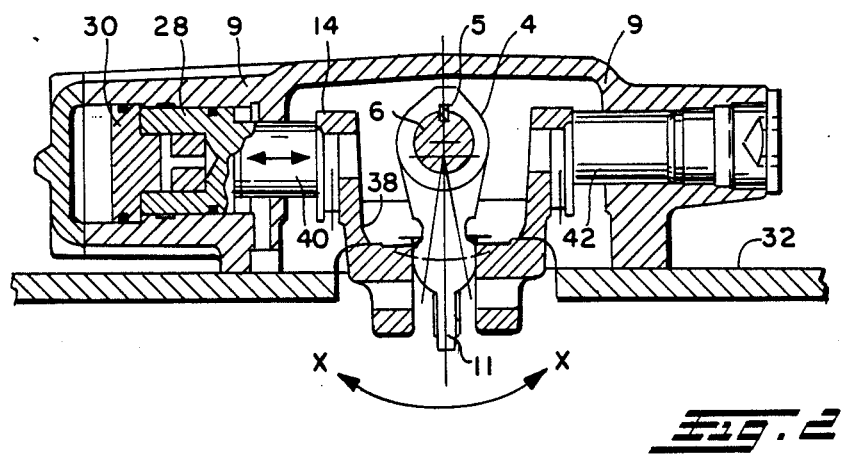
FIG. 2 is a cross-sectional view taken along view line 2—2 of mechanism 100 of FIG. 1.

Shifting mechanism 100 of FIG. 1 is a fluid operated (X-Y) shifting mechanism adapted to be mounted by means of bolts 7 or the like to a mechanical change gear transmission having a housing generally referenced by numeral 32 in FIG. 2.

Mechanism 100 has a shift finger 4 fixedly secured to a shaft member 6 by means such as key 5. Shaft 6 is threadingly secured to bolt 3 having a washer 13 which are rotatable relative fluid operated piston 12 hereinafter described and enable shaft member 6 to rotate in response to pivotal movement of shift finger 4 in the (X—X) direction shown in FIG. 2.

As shown in FIG. 1, mechanism 100 has a housing generally referenced by numeral 9 in which shaft member 6 is reciprocally movable in a manner enabling it to move axially in a (Y—Y) direction that is substantially transverse to the (X—X) direction.

Generally, pivoting of shift finger 4 in the (X—X) direction into preselected positions aligns end 11 with a particular shift rail (not shown) desired and axial movement of shaft member 6 in the (Y—Y) direction selected then causes end 11 to move the rail axially in the (Y—Y) direction desired to effect the gear shift.

Shaft member 6 is moved in the (Y—Y) direction by at least one first fluid operated piston 12 that is received in bore 18 within housing 9. An end of shaft member 6 is supported in an open-ended bore 10 in an end of piston 12 facing towards shaft 6 and shift finger 4.

Opposite axial movement of piston 12 within bore 18 is operative to move shaft member 6 and shift finger 4 in the (Y—Y) direction in addition to shaft member 6 being rotatable within bore 10 relative piston 12.

Preferably two first fluid-operated pistons are employed to move shaft member 6 and shift finger 4 in the (Y—Y) direction with the first being previously described piston 12 and the second being piston 20 shown in FIG. 1 that is reciprocally movable within bore 19 and adopted to cooperate with piston 12 in moving shaft 6 and shift finger 4 to a pre-selected position in the (Y—Y) direction according to pre-selected signals provided solenoids 22 and 24 for controlling fluid flow through passageways generally referenced by numeral 26 as is well known to those skilled in the art of fluid-operated transmissions.

As shown in FIG. 2, shift finger 4 is pivoted about the central rotational axis of shaft member 6 by axial movement of shafts 40 and 42 in the (X—X) direction as shown by the horizontal arrows.

A yoke 38 has opposite legs secured respectively to shafts 40 and 42 and is adapted to engage opposite sides of shift finger 4 a displaced distance from the center line of shafts 40 and 42 which causes shift finger 4 to pivot in the (X—X) direction as shown by the curved arrows.

Shaft 40 is moved in the (X—X) direction by at least one second fluid-operated piston 28 and preferably by two second fluid operated pistons with one being piston 28

What is claimed is:

1. An improved (X-Y) shifting mechanism for shifting change gears of a mechanical change gear transmission of the type having a plurality of shift rails selectively engageable by pivotal movement of a shift finger that is fixedly secured to a shaft member and is pivoted in a first (X—X) direction by at least one first fluid-operated piston operatively connected thereto and is moved in a second axial (Y—Y) direction substantially transverse to the (X—X) direction by at least one second fluid-operated piston operatively connected to the shaft member to effect the gear shift selected, said improvement characterized by said shaft member operative to move the shift finger in the (Y—Y) direction by having an end thereof supported in an open-ended bore of said second fluid-operated piston and adapted to enable the shaft member to rotate relative said second piston and thereby lessen rotational inertia and friction encountered in pivoting the shift finger in the (X—X) direction while enabling said second piston to move the shift finger in the (Y—Y) direction.

2. The mechanism of claim 1 including at least one fluid sealing member disposed between the shaft member and the piston surface surrounding the bore in which the shaft member is supported.

3. The mechanism of claim 2 wherein the sealing member is an elasteromeric ring.

4. The mechanism of claim 1 having two first fluid-operated pistons operative to cooperate with each other and pivot the shift finger in the (X—X) direction according to pre-selected conditions.

5. The mechanism of claim 1 having two fluid-operated pistons operative to cooperate with each other and move the shift finger axially in the (Y—Y) direction with one of said pistons having the bore therein which the shaft member is supported.

6. A mechanical change gear transmission having the shifting mechanism of claim 4.

7. A mechanical gear transmission having the shifting mechanism of claim 1.

* * * * *